US012747947B2

(12) United States Patent
Ramanathan et al.

(10) Patent No.: US 12,747,947 B2
(45) Date of Patent: Sep. 29, 2026

(54) ROBOT POSE ESTIMATION

(71) Applicant: ObjectVideo Labs, LLC, Tysons, VA (US)

(72) Inventors: Narayanan Ramanathan, Chantilly, VA (US); Timon Meyer, Centreville, VA (US); Aditya Shiwaji Rasam, McLean, VA (US); Gang Qian, McLean, VA (US); Donald Gerard Madden, Columbia, MD (US); Glenn Tournier, Vienna, VA (US)

( * ) Notice: Subject to any disclaimer, the term of this patent is extended or adjusted under 35 U.S.C. 154(b) by 464 days.

(21) Appl. No.: 18/206,810

(22) Filed: Jun. 7, 2023

(65) Prior Publication Data

US 2023/0392931 A1 Dec. 7, 2023

Related U.S. Application Data

(60) Provisional application No. 63/349,782, filed on Jun. 7, 2022.

(51) Int. Cl.
*G01C 21/00* (2006.01)
*B64U 10/14* (2023.01)
(Continued)

(52) U.S. Cl.
CPC ........... *G01C 21/005* (2013.01); *B64U 10/14* (2023.01); *G05D 1/101* (2013.01); *G06T 7/55* (2017.01); *G06T 7/73* (2017.01); *G08G 5/32* (2025.01); *G08G 5/55* (2025.01); *G08G 5/57* (2025.01); *B64U 2101/30* (2023.01)

(58) Field of Classification Search
CPC .. B60L 58/40; B60L 15/2072; B60L 2240/14; B60L 2240/423; B60L 2250/28; B60L 2260/26; B60L 58/13; B60L 2240/547; B60L 2240/549; H01M 8/04925; H01M 16/006; H01M 2220/20; H01M 2250/20; Y02T 10/70; Y02T 90/40; G01R 31/382; Y02E 60/50
See application file for complete search history.

(56) References Cited

U.S. PATENT DOCUMENTS 10,611,028 B1 * 4/2020 Zhou .................... G05D 1/0246
11,417,017 B2 * 8/2022 Garud ...................... G06T 7/75
(Continued)

OTHER PUBLICATIONS

PCT International Search Report and Written Opinion in International Appln. No. PCT/US2023/068054, dated Oct. 5, 2023, 9 pages.

*Primary Examiner* — Abdalla A Khaled
(74) *Attorney, Agent, or Firm* — Fish & Richardson P.C.

(57) ABSTRACT

Methods, systems, and apparatus, including computer programs encoded on computer storage media, for estimating a robot pose. One of the methods includes the actions of obtaining two or more images captured at two or more locations on a property; detecting feature points at positions within two or more images including first feature points in the first image and second feature points in the second image; comparing the positions of the first feature points in the first image to positions of the second feature points in the second image; obtaining data indicating the two or more locations on the property; comparing the two or more locations; and generating depth data for the feature points for use by a robot navigating the property.

20 Claims, 5 Drawing Sheets

(51) Int. Cl.

| | |
|---|---|
| ***G05D 1/00*** | (2006.01) |
| ***G06T 7/55*** | (2017.01) |
| ***G06T 7/73*** | (2017.01) |
| ***G08G 5/32*** | (2025.01) |
| ***G08G 5/55*** | (2025.01) |
| ***G08G 5/57*** | (2025.01) |
| *B64U 101/30* | (2023.01) |

(56) References Cited

U.S. PATENT DOCUMENTS

| | | | | |
|---|---|---|---|---|
| 11,573,544 | B2 * | 2/2023 | Henry | B64D 47/08 |
| 11,703,864 | B2 * | 7/2023 | Henry | G05D 1/69<br>701/3 |
| 11,774,983 | B1 * | 10/2023 | Zhang | G05D 1/0253<br>701/28 |
| 2017/0094245 | A1 * | 3/2017 | Barakat | H04N 23/60 |
| 2018/0136650 | A1 * | 5/2018 | Tian | G05D 1/0038 |
| 2019/0265734 | A1 * | 8/2019 | Liu | G06V 20/17 |
| 2019/0333187 | A1 * | 10/2019 | Gubbi Lakshminarasimha | G06T 3/18 |
| 2020/0272144 | A1 * | 8/2020 | Yang | B64U 10/14 |
| 2021/0190497 | A1 * | 6/2021 | Derhy | G06T 7/593 |
| 2021/0239472 | A1 * | 8/2021 | Pajovic | B25J 9/1682 |
| 2021/0263488 | A1 * | 8/2021 | Henry | B64D 47/08 |
| 2021/0263515 | A1 * | 8/2021 | Henry | G06T 17/00 |
| 2021/0284037 | A1 * | 9/2021 | Rezvani | B64U 50/34 |
| 2021/0362875 | A1 * | 11/2021 | Yi | G05D 1/101 |
| 2022/0148219 | A1 * | 5/2022 | Kim | G06T 7/74 |
| 2022/0206509 | A1 * | 6/2022 | Guo | G05D 1/0223 |
| 2022/0337751 | A1 * | 10/2022 | Bleyer | G06T 7/579 |
| 2022/0337894 | A1 * | 10/2022 | Price | G06T 17/20 |
| 2022/0375105 | A1 * | 11/2022 | Elsdon | G06T 7/246 |
| 2023/0107993 | A1 * | 4/2023 | Kupcsik | B25J 9/1697<br>700/253 |
| 2023/0206647 | A1 * | 6/2023 | Huang | G05D 1/027<br>701/26 |
| 2023/0324911 | A1 * | 10/2023 | Henry | G05D 1/46<br>701/2 |
| 2023/0409040 | A1 * | 12/2023 | Dai | G05D 1/0242 |

* cited by examiner

ROBOT POSE ESTIMATION

CROSS-REFERENCE TO RELATED APPLICATION

This application claims the benefit of U.S. Provisional Application No. 63/349,782, filed Jun. 7, 2022, the contents of which are incorporated by reference herein.

BACKGROUND

A monitoring system for a property can include various components including sensors, e.g., cameras, and other devices. For example, the monitoring system may use the camera to capture images of people or objects of the property. Sometimes a monitoring system can use a drone to capture sensor data.

SUMMARY

This specification describes techniques, methods, systems, and other mechanisms for estimating a pose of a robot. The pose of a robot can include indications of roll, pitch, yaw, or a combination of these. Some methods that track a pose or position of a robot over time can be susceptible to measurement drift where the resulting pose estimation becomes less and less accurate and/or reliable over time. In order to prevent an incorrect pose from affecting operation of a robot, a process, e.g., implemented by a component of the robot, can estimate a pose and update the robot's actual pose using that estimate, e.g., when the robot's actual pose varies from the robot's predicted pose.

The process of estimating the pose of a robot can include identifying depths of features captured in images of an environment then using the depths to determine a robot's pose (e.g., roll, pitch, and yaw) in a three dimensional space. In environments without depth information or where depth information has not yet been recorded, a process may use a change of position from one location to another indicated by visual inertial odometry (VIO) measurement or other measurement processes to generate a scale factor to determine depths of features within a captured image. The captured image can be stored with identifying information to be used for later estimations of robot poses in the vicinity of the location where the image was captured.

Robots can include drones. Robots can use vision (camera feed), time-of-flight (TOF), Light Detection and Ranging (LIDAR), sonar, other data streams, or a combination of these, that come from built-in sensors to estimate a pose.

In general, one innovative aspect of the subject matter described in this specification can be embodied in methods that include the actions of obtaining two or more images captured at two or more locations on a property, the two or more images including a first image and a second image; detecting feature points at positions within the two or more images, the feature points including first feature points in the first image and second feature points in the second image; comparing the positions of the first feature points in the first image to positions of the second feature points in the second image; obtaining data indicating the two or more locations on the property; comparing the two or more locations; and generating, using results of a) the comparison of the position of the feature points in the first image and the second image and b) the comparison of the two or more locations, depth data for the feature points for use by a robot navigating the property.

In general, one innovative aspect of the subject matter described in this specification can be embodied in methods that include the actions of obtaining, from a robot, an image at a location of a property; obtaining data indicating the location; selecting a key frame from one or more key frames for the property using data for the image and the one or more key frames; comparing, for at least one of one or more feature points in the key frame, a position of a feature point from the feature points in the image to a position of the respective feature point in the key frame; generating a pose estimation for the robot using depth data for the key frame and the results of the comparison, for the at least one of one or more feature points in the key frame, of the position of the feature point from the feature points in the image to the position of the respective feature point in the key frame; and causing an update to a pose of the robot using the pose estimation.

Other implementations of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. For instance, in some implementations, generating the depth data for the feature points uses an epipolar process and a scale factor. In some implementations, obtaining the two or more images includes obtaining the two or more images captured by a camera at the two or more locations on the property; and the scale factor maps camera units to real world units for the property.

In some implementations, actions include generating the scale factor using a change between a first location at which the first image was captured and a second location at which the second image was captured, the two or more locations including the first location and the second location. In some implementations, actions include generating the scale factor using an amount of overlap between the first image and the second image. In some implementations, actions include determining whether a difference between a first location at which the first image was captured and a second location at which the second image was captured satisfies a difference threshold. Generating depth data for the feature points is responsive to determining that the difference between the first location at which the first image was captured and the second location at which the second image was captured satisfies the difference threshold.

In some implementations, generating the depth data for the feature points can include generating depth data that indicates a relationship between the first feature points of the first image and the second feature points of the second image. In some implementations, actions include providing the depth data to the robot to cause the robot to use the depth data for navigation at the property.

In some implementations, comparing, for the at least one of the one or more of the feature points in the key frame, the position of the feature point from the feature points in the image to a position of the respective feature point in the key frame uses an epipolar process. In some implementations, actions include determining a scale factor using a key frame location at the property at which a camera captured the key frame and the location at the property for the image. Generating the pose estimation for the robot uses the scale factor. In some implementations, actions include determining a scale factor using the depth data for the key frame. In some implementations, causing the update to the pose of the robot uses the pose estimation and an expected pose of the robot. In some implementations, actions include obtaining, using the data, one or more key frames and depth data for the one or more key frames. In some implementations, selecting a key frame from one or more key frames for the property using data for the image and the one or more key frames uses a result of a comparison of feature points of the image to feature points of at least one of the one or more key frames. In some implementations, selecting a key frame from one or more key frames for the property using data for the image and the one or more key frames uses the location at the property for the image and at least one location of a respective key frame from the one or more key frames.

The subject matter described in this specification can be implemented in various implementations and may result in one or more of the following advantages. In some implementations, use of a scale factor, depth data, or both, a system can generate a more accurate pose correction, e.g., than use of VIO location data alone. In some implementations, use of a scale factor, depth data, or both, for robot navigation at a property can result in more accurate robot movement at a property, reduced unexpected collisions, reduced property damage, reduced personal injury, or a combination of two or more of these.

In some implementations, providing more accurate pose or mapping allows a robot to find its intended destination faster, with less chance of becoming lost (e.g., incorrectly determining global position or constructing an inaccurate map), or both. For example, systems or processes described in this document can generate depth data using image data to help provide more accurate pose or mapping for a robot operating at a property.

The details of one or more embodiments of the invention are set forth in the accompanying drawings and the description below. Other features and advantages of the invention will become apparent from the description and the drawings.

BRIEF DESCRIPTION OF THE DRAWINGS

Like reference numbers and designations in the various drawings indicate like elements.

DETAILED DESCRIPTION

Figure 1:
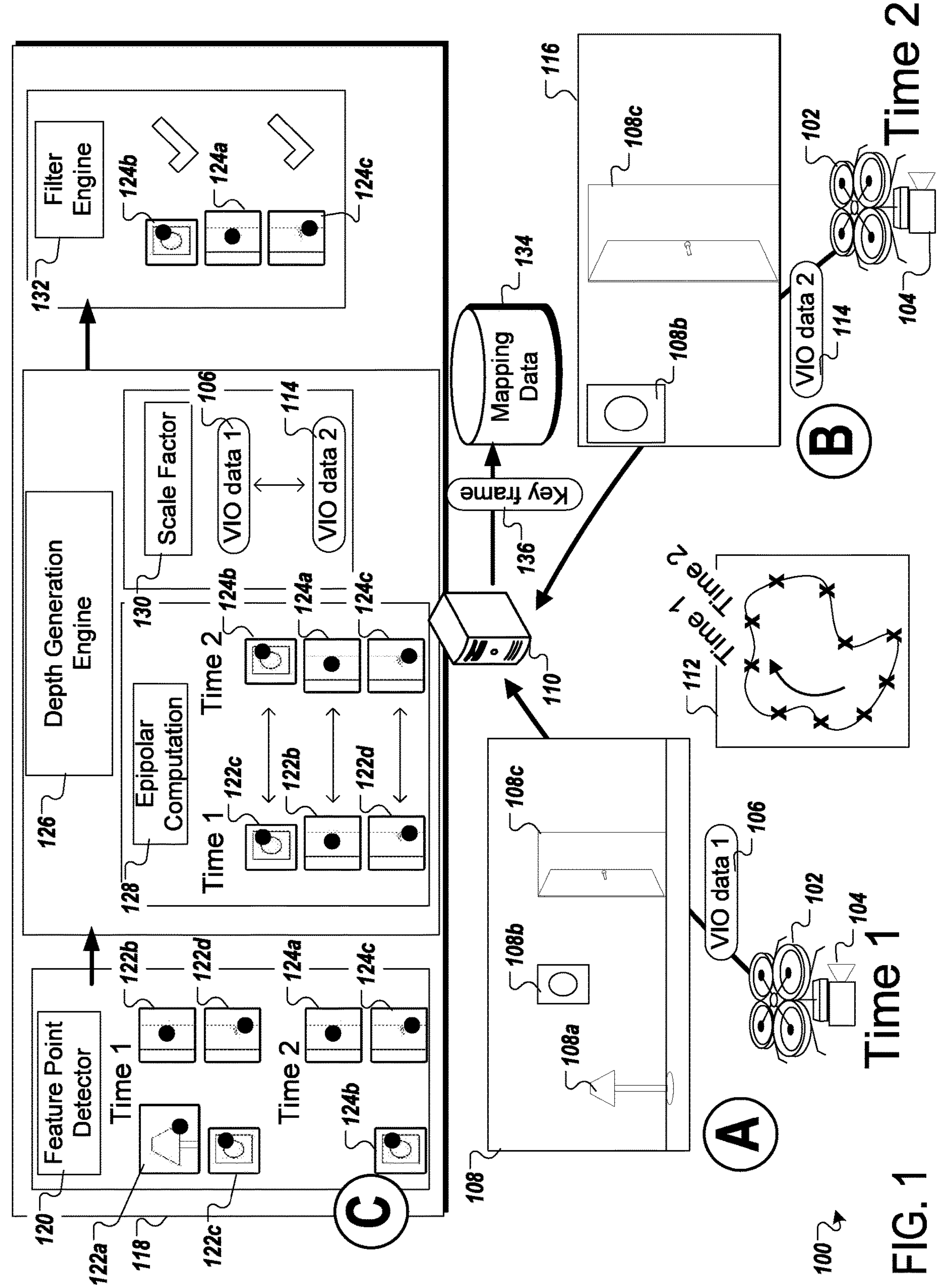
FIG. 1 is a diagram showing an example of a system for obtaining depth data in an environment.

FIG. 1 is a diagram showing an example of a system 100 for obtaining depth data in an environment. The system 100 includes a robot 102. In the example of FIG. 1, the robot 102 is a drone. The methods and processes described in this specification are applicable to other types of robots as well, such as robots that move along the ground.

The robot 102 includes a sensor configured to identify features in an environment. In the example of FIG. 1, the sensor is a camera 104. The camera 104 can capture one or more images in a visible range of electromagnetic radiation (e.g., visible light, such as 380 to 750 nanometers, 310 to 1100 nanometers, among others) or non-visible (e.g., infrared, ultraviolet, among others). In some implementations, the sensor detects sound waves where the sound waves indicate positions of elements within an environment.

The system 100 includes a control unit 110 communicably connected to the robot 102. The control unit 110 can be implemented on one or more devices separate from the robot 102. In some implementations, the control unit 110 can be implemented in the robot 102.

At a first time, Time 1, the robot 102 is at a first location, e.g., indicated on map 112. At a second time, Time 2, the robot 102 is at a different location, e.g., indicated on map 112. The robot 102 can move between locations using one or more components of the system 100, e.g., using a pose estimation or other data from the one or more components. This can occur when a user installs the system 100, or the one or more components of the system 100, at a physical property. In some examples, the one or more components of the system 100 can be installed on the robot 102. The robot 102 can physically move using onboard propellers, wheels, other elements for locomotion, or a combination of these, either autonomously or semi-autonomously.

At each of two locations at a property shown in the map 112, the robot 102 captures one or more images using the camera 104. The control unit 110 processes the images to determine depth data for a key image frame. The control unit 110 can store the key image frame as mapping data 134 for later use in estimating a pose of a robot, either the robot 102 or another robot. The control unit 110 can store the mapping data 134 on a memory storage element of the control unit 110 or a server communicably connected to the control unit 110.

FIG. 1 is described in stages from A to C. Although described sequentially, at least some of the stages can overlap or occur substantially concurrently. For instance, when the robot 102 provides data to the control unit 110 during stage A, the control unit 110 can begin to process the received data while the robot 102 proceeds to stage B.

Stages A and B show the robot 102 at Time 1 and Time 2, after Time 1, providing data to the control unit 110 corresponding to Time 1 and Time 2. The robot 102 can provide the data to the control unit 110 at Time 1 and Time 2, respectively, or can provide the data at a later time. The robot 102 can provide the data with an indication, such as a timestamp, of when the data was captured (e.g., at Time 1 and Time 2). Stage C shows the control unit 110 processing that data.

In stage A, the robot 102 captures the first image 108 and provides the first image 108 to the control unit 110. The robot 102 can also capture first data 106 indicating a current location. The first data 106 indicating the current location can include data from a visual inertial odometry (VIO) system or other positioning system, such as a global positioning system (GPS) or local positioning system (LPS). The example of FIG. 1 shows the first data 106 as first VIO data.

The first image 108 depicts environmental elements 108_a_-_c_. The elements 108_a_-_c_ can include any structure or appearance within a captured image. In the example of FIG. 1, the elements 108_a_-_c_ include, respectively, a lamp 108_a_, a painting 108_b_, and a door 108_c_. The elements correspond to the environment of a physical indoor property. Other elements may be captured in an image depending on the environment traversed by the robot 102.

In stage B, the robot 102 captures the second image 116. The second image 116 depicts elements 108*b-c* but does not depict 108*a*. In general, the second image 116 can include one or more similar elements from the first image 108, e.g., depending on the distance the robot 102 moved between stage A and stage B. In this example, the robot 102 is moving towards the door 108*c* and the field of view captured by the camera 104 covers only the painting 108*b* and the door 108*c*.

Similar to stage A, the robot 102 provides the second image 116 and the second data 114 indicating a location of the robot 102 when the camera 104 captured the second image 116. The location of the robot 102 can be determined when a shutter of the camera 104 opens, when it closes, when the image is saved locally on the robot 102, or corresponding to another step included in the process of capturing the second image 116. The time when the location is recorded corresponding to an image capture can be standardized so that any delay or offset is canceled out when comparing locations from multiple image captures.

A VIO system operated by the robot 102 or a device communicably connected to the robot 102, such as the control unit 110, can determine how the robot is moving. The VIO system can include one or more inertial sensors, e.g., an accelerometer, onboard the robot 102. The VIO system can determine how the robot 102 is moving based on measurements from the inertial sensors. By tracking the changes in inertia over time, the VIO system can determine a location, e.g. an estimated location, of the robot 102 at any given time. In the example of FIG. 1, the robot 102 records the location indicated by VIO when the images 108 and 116 are captured.

In stage C, the control unit 110 processes the data obtained from the robot 102. The control unit 110 can process the data serially after Time 1 and after Time 2, or after Time 2. For example, the control unit 110 can determine feature points in obtained images as they are received from the robot 102.

A feature point detector 120 of the control unit 110 can determine first feature points 122*a-d* from the first image 108 and second feature points 124*a-c* from the second image 116. In some implementations, the control unit 110 stores the feature points determined from images in local storage. In some implementations, the control unit 110 stores the feature points determined from images in storage of a device communicably connected to the control unit 110.

In some implementations, the camera 104 captures video along a route, such as the route shown in the map 112. The video can include multiple images as frames of the video. The processing shown in stage C can be performed after the camera 104 captures video. The control unit 110 can determine, as images, adjacent frames of the video and process the adjacent frames as described with respect to images 108 and 116. The robot 102 can provide video and indications of locations where the video was recorded along the route to the control unit 110.

In some implementations, the control unit 110 processes multiple pairs of images. For example, the control unit 110 can process the image pair including the first image 108 and 116 as well as another image pair captured by the robot 102. The control unit 110 can determine, based on detected features and filtering, what images, of the multiple processed images, should be recorded as key frames. In some implementations, the control unit 110 selects images that include more detected feature points as key frames over images that include fewer detected feature points.

The feature point detector 120 of the control unit 110 processes areas of the images 108 and 116 to determine feature points 122*a-d* and 124*a-c*. The feature point detector 120 can use any appropriate process to detect specific local feature points and characterize the points with feature descriptors. In some cases, feature detectors can include, e.g. Scale-invariant Feature Transform (SIFT), speeded up robust features (SURF), SuperPoint, among others. Feature detectors and descriptors can be hand-engineered or learned.

Parameters indicating feature descriptors can be used to determine similarity between detected feature points. For example, a feature point described as a door handle can match, e.g., have a similarity that satisfies a matching threshold, with another feature point described as a door handle and not match, e.g., have a similarity that does not satisfy the matching threshold, a feature point described as an edge of a painting. Descriptions for the feature points 122*b* and 124*a* can include a door handle. Descriptions for the feature points 122*d* and 124*c* can include a door edge. Descriptions for the feature points 122*c* and 124*b* can include a painting edge.

Representations of the features points 122*a-d* and 124*a-c* can include an indication of where in the corresponding image the point is represented. For example, positions within the images 108 and 116 can include x and y coordinates, polar coordinates, among other systems to identify a specific position for the feature points 122*a-d* and 124*a-c*.

The control unit 110 matches features 122*a-d* and 124*a-c*. Because no matches satisfying a matching threshold were found for the feature 122*a* (corresponding to the lamp 108*a*), the control unit 110 determines that the feature 122*a* does not match any of the features from the second image 116. This occurs because, in the example of FIG. 1, the second image 116 does not include the lamp 108*a* and so does not include a feature similar to the feature 122*a*.

In some implementations, the control unit 110 determines that a feature existing in the second image 116 does not sufficiently match a feature in the first image 108. For example, a feature can be blurred, distorted, obscured or otherwise visually altered in an image such that the control unit 110 cannot determine, to the sufficiency of the matching threshold indicating a likely match, that the given feature in the first image 108 is likely the same feature in the second image 116.

The control unit 110 determines that the features 122*b-d* and the features 124*a-c*, respectively, satisfy a matching threshold. In response, a depth generation engine 126 uses the feature points determined by the feature point detector 120, including features 122*b-d* and 124*a-c*, and the first data 106 and 114 indicating a change in location of the robot 102 to determine an indication of depth of the matched features 122*b-d* and 124*a-c*.

The depth generation engine 126 can perform epipolar computation 128 based on the locations for each of the feature points 122*b-d* and 124*a-c* in their respective images. In some implementations, the depth generation engine 126 generates a matrix that relates the matching points 122*b-d* and 124*a-c* through epipolar computation 128. The epipolar computation 128 can include determining constraints on the three dimensional positioning of the points 122*b-d* and 124*a-c* based on the projection of the points on the two dimensional images 108 and 116. In some implementations, the depth generation engine 126 generates a matrix for each match of the points 122*b-d* and 124*a-c*.

In some implementations, the depth generation engine 126 generates an essential matrix indicating a relation between the points 122*b-d* and 124*a-c*. For example, the depth generation engine 126 can generate a rotational matrix and a translation vector. The rotational matrix can represent rotational change between the projection of the points 122*b-d* in the first image 108 and the projection of the points 124*a-c* in the second image 116. The translation vector can represent the motion of the camera 104 from Time 1 corresponding to the capturing of the first image 108 to Time 2 corresponding to the capturing of the second image 116. The essential matrix can include both the rotational and translational change that affect the apparent movement of points 122*b-d* in first image 108 to points 124*a-c* in second image 116.

Because the depth of the elements in the images 108 and 116 are not known, the matrix generation comparing the points 122*b-d* in first image 108 to points 124*a-c* in second image 116 can be represented in normal units or without scale. One method to determine the units or scale is to assume the distance between the location corresponding to the capturing of the first image 108 and the location corresponding to the capturing of the second image 116 is 1 camera unit. Using the epipolar computation 128 and triangulation methods, a depth of the points 122*b-d* and 124*a-c* can be determined in camera units.

In some examples, in order to more accurately determine the depth of the points on elements of the captured images in real-world units, the depth generation engine 126 can generate a scale factor 130. The scale factor 130 represents the actual distance between the location corresponding to the capturing of the first image 108 and the location corresponding to the capturing of the second image 116. The depth generation engine 126 computes this distance by comparing the first data 106 and the second data 114. The first data 106 and the second data 114 can include coordinate values representing a location within the property represented in the map 112. The depth generation engine 126 computes the distance between these two locations and generates the scale factor 130 as the computed distance.

The depth generation engine 126 can generate estimated real world depths of the matched feature points 122*b-d* and 124*a-c*, e.g., using the scale factor. The depth generation engine 126 can multiply the computed depths of the points 122*b-d* and 124*a-c* in camera units by the scale factor 130 to generate depths of the points 122*b-d* and 124*a-c* in real-world units, such as feet or meters. In some implementations, the depth generation engine 126 computes a scale factor 130 based on the actual distance between the camera 104 at Time 1 and the camera 104 at Time 2 and the number of camera units between the same two points. The depth generation engine 126 can, e.g., for increased efficiency, determine the distance between the two points as 1 camera unit such that the scale factor 130 is the actual distance between the camera 104 at Time 1 and the camera 104 at Time 2.

In general, VIO may be less prone to drift for translation movement compared to rotational movement allowing the VIO measurements to be used for generating the scale factor 130. The depth generation engine 126 can use the VIO measurements to determine the actual distance between the camera 104 at Time 1 and the camera 104 at Time 2. The process shown in FIG. 1 of moving the robot 102 from a first location to a second and capturing the images 108 and 116 can be performed in a mapping phase of a property where the robot 102 is moving more slowly and less prone to inaccuracy or is directly controlled by a user to ensure that the translation movement is correctly recorded.

The depth generation engine 126 can generate feature point data that includes the data generated by the feature point detector 120, including locations of feature points, the actual depth of the feature points generated by the depth generation engine 126, or both.

The depth generation engine 126 provides feature points to a filter engine 132. The feature points can include the feature points 124*a-c*.

The filter engine 132 can perform one or more filtering operations based on the feature points generated by the feature point detector 120 and the depth generation engine 126. In some implementations, the filter engine 132 performs one or more of realism filtering or distribution filtering. For example, for realism filtering, the filter engine 132 can compare depth measurements to one or more depth thresholds to determine whether to record or remove feature points. In some implementations, the filter engine 132 determines that all depths for feature points inside a property that do not satisfy at least one of the depth thresholds, e.g., are over 100 meters or depths that are negative, are invalid. The filter engine 132 can mark the points as invalid or directly discard them. In some implementations, the invalid points are stored for diagnostic and training purposes. Valid measurements can be stored in a key frame for subsequent pose estimation In some implementations, depth thresholds are programmed by a user based on knowledge of an environment, determined dynamically, or a combination of both. In some implementations, the filter engine 132 performs a grouping process, such as k-mean clustering or other clustering algorithm, to determine outliers and removes points that correspond to outlying depth values. For example, if three depth values satisfy a corresponding threshold, e.g., are within 5 to 10 meters of each other, and a fourth depth value does not satisfy the corresponding threshold, e.g., is over 20, the fourth can be determined an outlier and marked as invalid or discarded.

In some implementations, the filter engine 132 determines a threshold based on grouping one or more depth values, e.g., for dynamic thresholding. For example, the filter engine can determine a threshold by grouping the three depth values between 5 to 10 meters apart to determine a threshold (e.g., maximum, average, minimum, mode, mean squared, among others). The filter engine 132 can compare the fourth depth value, over 20 meters, to the threshold and determine that the fourth value does not satisfy the threshold.

For distribution filtering, the filter engine 132 can determine if the feature points for a given set of two images are distributed throughout an environment. The filter engine 132 can obtain feature points for one or more additional adjacent images in addition to the images 108 and 116. The filter engine 132 can compare the distribution of matched features in one pair of images to another pair of images. For example, the filter engine 132 can generate an average distance between features and determine, based on comparing the average distance between features for multiple pairs of images processed by the control unit 110, whether a given image pair includes points that are well distributed in an environment. Well distributed points can include points that have an average distance between them that satisfies, e.g., is higher than, one or more other average distances representing distances between other matched feature points from other image pairs or that have an average distance within a top portion of all paired images processed that satisfies, e.g., is within, a time duration or portion of a property by the control unit 110.

The filter engine 132 determines that the feature points 124*b* and 124*c* satisfy filtering criteria and one or more of the image pair 108 and 116 can be stored as a key frame 136 for subsequent pose estimation. The key frame 136 can include an indication of the points 124*b* and 124*c*, the locations corresponding to first data 106 and 114, and depth data for feature points (e.g., matched and filtered features 124*b* and 124*c*). The key frame 136 can be included in the mapping data 134. The mapping data 134 can include an index for later retrieval. For example, the index can be a location such that the control unit 110, or other system communicably connected to the mapping data 134 data store, can query for key frames within an area that includes the location and retrieve said key frames indicating depths of feature points within that area.

In some implementations, only one image from a processed pair is stored as the key frame 136 in as mapping data 134. For example, the control unit 110 can determine what image includes all the matched and filtered feature points and include that image as the key frame 136 in the mapping data 134. In some implementations, both images are included in the mapping data 134.

The process shown in FIG. 1 can be repeated for multiple pairs of images as captured by the robot 102 or another robot to identify and store depth information for multiple feature points within a property.

Figure 2:
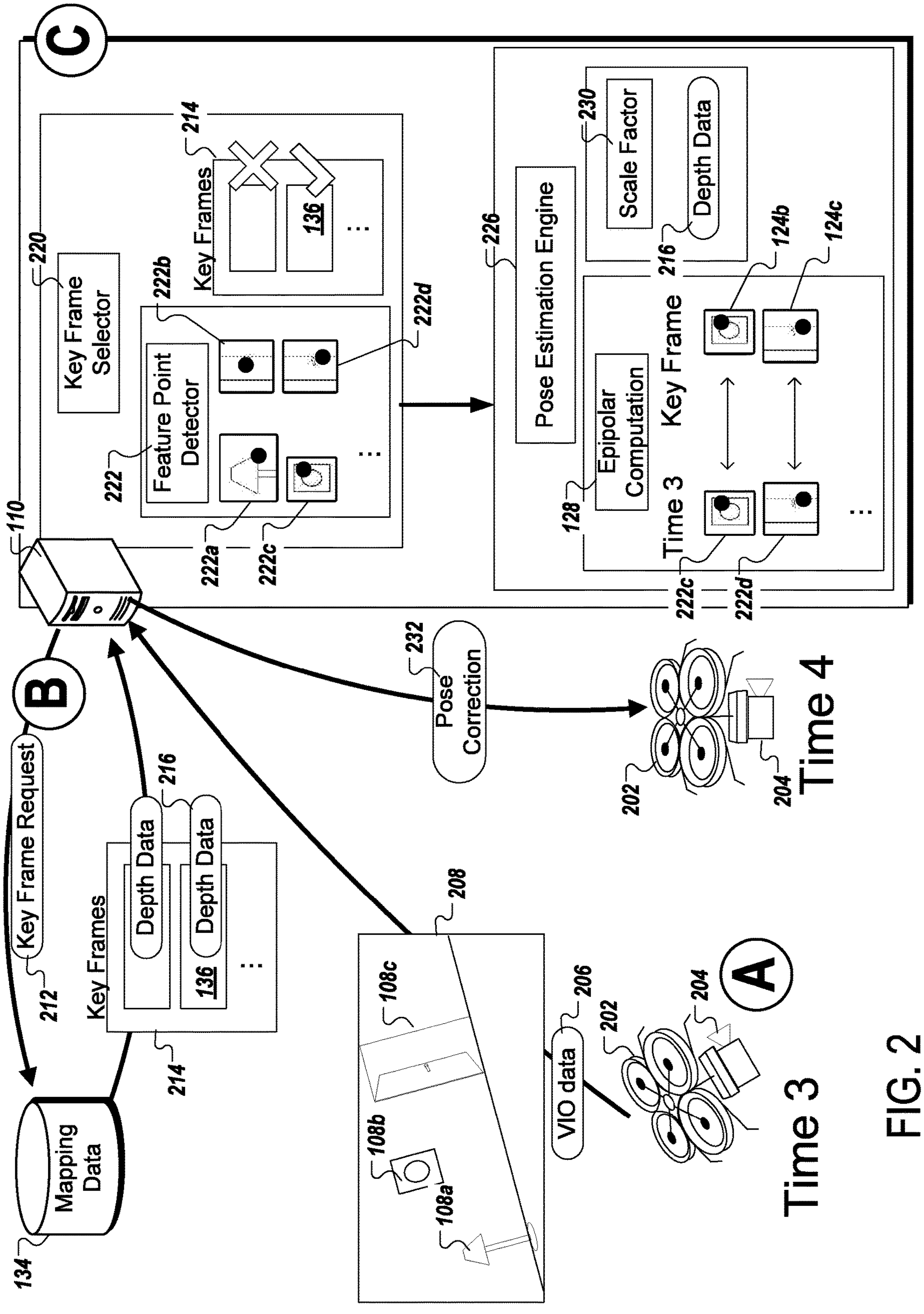
FIG. 2 is a diagram showing an example of using the depth data to estimate a pose of a robot.

FIG. 2 is a diagram showing an example of using the depth data stored with the key frame 136 to estimate a pose of a robot 202. The control unit 110 obtains data from the robot 202 at Time 3, after Time 2, indicating that the robot 202 requires a pose estimation. The control unit 110 queries and obtains key frames corresponding to a current position of the robot 202 from the mapping data 134 and processes both the data obtained from the robot 202 and the key frame data from the mapping data 134 to generate a pose estimation to correct a pose of the robot 202.

Similar to the robot 102, the robot 202 of the example of FIG. 2 is a drone that flies and is equipped with sensors, including the camera 204 similar to camera 104. In some implementations, the control unit 110 provides pose estimation to the same robot 102 or a robot of a different type, such as a robot that moves on the ground.

FIG. 2 is also shown in stages from A to C. Although described sequentially, at least some of the stages can overlap or occur substantially concurrently. For instance, when the robot 102 provides data to the control unit 110 during stage A, the control unit 110 can begin to process the received data while the robot 102 proceeds from Time 3 to Time 4.

Stage A shows the robot 202 capturing the image 208 and the location data 206 and providing the data to the control unit 110. Stage B shows the control unit 110 obtaining key frames 214 from the mapping data 134. And stage C shows the control unit 110 processing the key frames 214 and the data from the robot 202 to estimate a correct pose (e.g., a pose that matches a predicted pose or a pose required for a mission) for the robot 202. The control unit 110 can then transmit a pose correction 232 determined using the estimated pose and the robot's 202 predicted pose, such as a sequence of actuator operations to adjust a pose, e.g., roll, pitch, or yaw, to the robot 202.

In stage A, the robot 202, equipped with the camera 204, captures the image 208 and location data 206. The image 208 depicts environmental elements 108*a-c*. As described in FIG. 1, these elements include a lamp 108*a*, a painting 108*b*, and a door 108*c*. The repetition of elements from FIG. 1 to FIG. 2 is used to effectively show both the generation of key frames and the use of those same key frames for pose estimation. In general, any elements or environment may be used. In this example, the robot 202 requests pose estimation in the same room as the generated key frame 136 from FIG. 1. In the example of FIG. 2, similar to the location data 106 and 114 of FIG. 1, the location data 206 is obtained from a VIO system operated by the robot 202 or a device communicably connected to the robot 202.

In stage B, the control unit 110 accesses the image 208 and the VIO data 206. In some implementations, the control unit 110 obtains a predicted pose estimate from the robot 202. The predicted pose estimate indicates the pose the robot 202 has recorded as its current pose. The control unit 110 then queries the mapping data 134. As discussed in FIG. 1, the mapping data 134 may be stored within an electronic storage device, such as flash memory, among others, of the control unit 110, or a device communicably connected to the control unit 110. The control unit 110 generates a key frame request 212 based on the image 208 and the VIO data 206 from the robot 202 and uses the request 212 to obtain the key frames 214. If the mapping data 134 is stored in a storage element of a device communicably connected to the control unit 110, the control unit 110 can send the request 212 to that device where the request 212 can be configured to instruct the device to query the mapping data 134. If the mapping data 134 is stored within the control unit 110, the control unit 110 can directly query the mapping data 134 based on the image 208 and the data 206.

In some implementations, the control unit 110 uses the data 206 and not the image 208 to determine key frames. For example, the control unit 110 can determine a location where the image 208 was captured based on the data 206. The control unit 110 can then query the mapping data 134 for key frames that satisfy a distance threshold for that location. The distance threshold can be a parameter tuned by an operator or with over the air updates to the system including the control unit 110 and the robot 202. The distance threshold can depend on the number of key frames stored (e.g., key frames stored as the mapping data 134). For example, if the mapping data 134 stores more key frames for a first portion of a property than a second portion of the property, the distance threshold when querying the mapping data 134 for key frames in the first portion can be smaller than the distance threshold when querying the mapping data 134 for key frames in the second portion. The threshold can be adjusted or be dynamic to prevent obtaining too many key frames. In some examples, the distance threshold can be configured such that each query returns a specified number of key frames based on, e.g., proximity to the location indicated by the data 206 from the robot 202. Proximity can be determined by the control unit 110 performing a distance calculation, e.g., Euclidean distance, between a location indicated by the data 206 and a location stored for a key frame in the mapping data 134.

The control unit 110 obtains the key frames 214. The key frames 214 can include the key frame 136 generated in the process shown in FIG. 1. The key frame 136 includes depth data 216 also generated in the process shown in FIG. 1. The depth data 216 can include depth information, in real world units, e.g., meters, feet, among others, for feature points detected within an environment. The depth data 216 can include a distance value indicating a distance from the camera 104 to a feature point in a real world space.

In stage C, the control unit 110 generates the pose correction 232 based on the data obtained from the robot 202 and the mapping data 134. A key frame selector 220 of the control unit 110 selects one or more frames from the key frames 214. In some implementations, the key frames 214 include multiple key frames within a distance threshold of the location indicated by the data 206. The key frame selector 220 can determine, based on comparing the feature points from the image 208 with the feature points of each key frame of the key frames 214, which key frame, or key frames, to select.

In the example of FIG. 2, the feature point detector 222 of the key frame selector 220 detects a number of feature points in the image 208. The feature point detector 222 can be similar or identical to the feature point detector 120 used for generating key frames shown in FIG. 1. The feature point detector 222 detects feature points 222*a-d* with corresponding descriptors as described in FIG. 1. These detected feature points are compared to the points of each key frame of the key frames 214.

In some implementations, the key frame with the most feature points matched with the feature points detected in the image 208 is used as the selected key frame. The feature points can be matched based on matching descriptors generated by the feature point detector 222. If a descriptor or other identifying information of a feature point of a key frame of the key frames 214 matches a detected feature point in the first image 108, the key frame selector 220 can record that the given key frame includes one feature point that matches a feature point of the image 208. The key frame selector 220 can record the number of matching feature points for each key frame of the key frames 214 and, based on comparing the number of matching feature points, select a top performing key frame as the selected key frame. The top performing key frame can be the key frame with the most matched feature points that have depth data associated with them.

The key frame selector 220 selects the key frame 136 as the selected key frame for determining a pose estimation. The control unit 110 provides the key frame 136 and the detected feature points 222*a-d* to the pose estimation engine 226. The pose estimation engine 226 generates the pose correction 232 based on this provided data. As described in FIG. 1, the pose estimation engine 226 performs epipolar computation 128. In FIG. 2, the epipolar computation includes comparing the detected feature points 222*c-d* with key frame feature points 124*b-c*. The key frame 136, as described in FIG. 1, includes two feature points with depth data, e.g., 124*b* and 124*c*. The control unit 110 determines which features points match between the selected key frame 136 and the features points of image 208 based on feature point descriptors (e.g., both feature points are "door handle"). The control unit 110 compares these matched feature points for epipolar computation 128.

Based on the comparison between the detected feature points 222*c-d* and the key frame feature points 124*b-c*, the pose estimation engine 226 generates a set of values indicating a current pose of the robot 202. As described in FIG. 1, one or more structures, such as matrices, for determining the pose and position of the robot 202, e.g., a rotational matrix and translation vector, are generated by the control unit 110. As described in FIG. 1, the set of values, such as a matrix, can be in normalized units based on an assumption of the image 208 and the key frame 136 being captured 1 camera unit away from one another.

The pose estimation engine 226 can generate a scale factor 230 based on the depth data 216 of the key frame 136. The pose estimation engine 226 can use the scale factor 230 to estimate the pose of the robot 202. The pose estimate engine 226 can generate the scale factor 230 using the depth data 216 instead of using the VIO data 206 to determine a location corresponding to when the image 208 was captured and then determine a scale factor using the difference. Using the depth data 216 to generate the scale factor can offer some advantages. Although the location recorded in the key frames and used to determine depth of detected feature points in the key frame generation stage in FIG. 1 can be accurate (e.g., more careful movement in a mapping phase, operator manually assisting or checking robot, among others), pose estimation correction can operate when VIO is used under normal circumstances. Like the drift which causes pose estimations to become erroneous over time, VIO indicating a position of a robot can also drift over time. By using the depth data 216, the control unit 110 can generate more accurate pose corrections that are not directly based on VIO location data. In some implementations, pose corrections are combined with position corrections where the control unit 110 determines a predicted position of the robot 202 and provides the predicted position to the robot 202 for the robot 202 to adjust its internal position record. This may improve subsequent accuracy in movements within a property, reduce unexpected collisions, property damage, or personal injury, or a combination of both.

As described, the set of values describing the depth of objects based on triangulation and epipolar computation 128 can be in camera units. By knowing the value of depths in the key frame 136 to feature points detected in the key frame 136, the pose estimation engine 226 can generate a scale factor 230 such that the scale factor 230 multiplied by the depth to a feature point in the key frame 136 matches the known depth based on the depth data 216. For example, if the depth data indicates that the painting edge, 124*b*, is 5 feet from the camera in the key frame 136 and the set of values indicating depth of values in normalized units is 2.3, the pose estimation engine 226 of the control unit 110 can compute a scale factor as the real-world depth to the painting edge divided by the normalized unit measurement for use in correcting normalized unit measurements to real-world unit measurements. The pose estimation engine can use the scale factor to generate one or more values estimating a pose of the robot 202.

The pose estimation engine 226 generates one or more values estimating a pose of the robot 202. The estimate can include one or more values indicating roll, pitch, yaw, or a combination of two or more of these. If the estimated pose is different from an expected pose (such as the predicted pose estimate transmitted by the robot 202 in stage A), the pose estimation engine 226 can generate instructions for actuators of the robot 202 to adjust the robot's physical pose in order to achieve the predicted pose estimate. For example, the roll can be predicted to be 0 and the robot 202 is predicted to be flying horizontally. The pose estimate generated by the pose estimation engine 226 can generate a new pose estimation indicating that the robot 202 has non-zero roll. The control unit 110 can generate the pose correction 232 configured to correct the roll from the non-zero value to zero. The control unit 110 transmits the pose correction 232 to the robot 202 and the robot 202, in response, corrects its pose.

In some implementations, the key frame selector 220 selects multiple key frames and the control unit 110 generates an estimated pose estimation for each key frame. For example, for each of two or more selected key frames, the control unit 110 can generate a pose correction. The control unit 110 can then generate a final pose correction based on the multiple pose corrections for each selected key frame. In some implementations, the final pose correction, e.g., the pose correction 232, is an average, or weighted average (e.g., weights computed based on re-projection error from the estimated pose and the distribution of matched features used to estimate the pose where frames with less re-projection error or more distributed matched features are assigned larger weights than frames with more re-projection error or less distributed matched features), of multiple pose corrections generated from two or more selected key frames.

In some implementations, the control unit 110 includes one or more computer processors onboard the robot 102 or the robot 202. In some implementations, the control unit 110 includes one or more computer processors communicably connected to the robot 102 or the robot 202.

Figure 3:
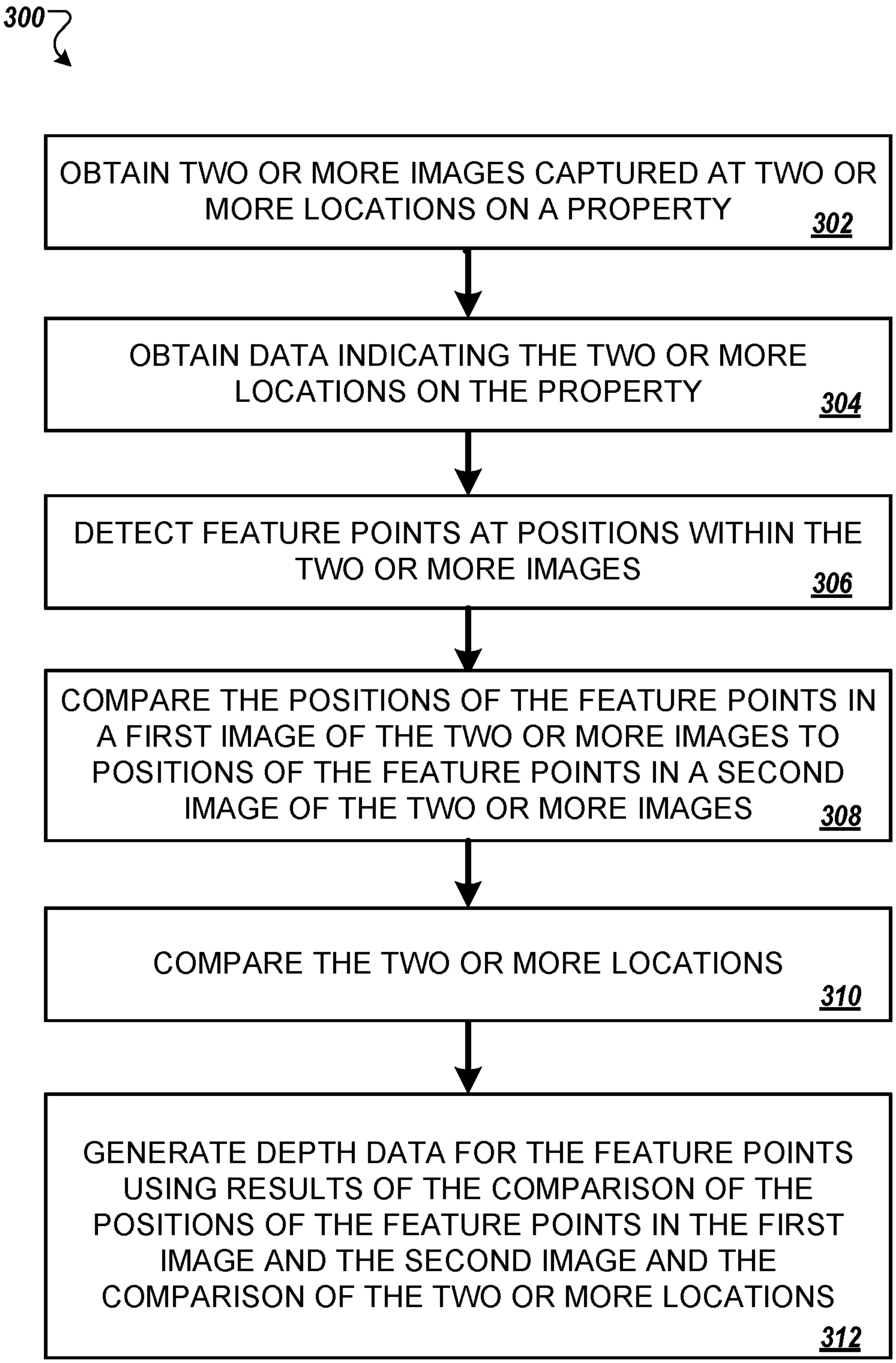
FIG. 3 is a flow diagram illustrating an example of a process for obtaining depth data in an environment.

FIG. 3 is a flow diagram illustrating an example of a process 300 for obtaining depth data in an environment. The process 300 can be performed by a computer, such as the control unit 110.

The process 300 includes obtaining two or more images captured at two or more locations on a property (302). For example, as shown in FIG. 1, the first image 108 is captured at a location corresponding to Time 1 and shown in the map 112. The second image 116 is captured at a different location corresponding to Time 2 and shown in the map 112. In some examples there is a time gap between the Time 1 when the first image 108 is captured and the Time 2 when the second image 116 is captured, e.g., indicating parallax movement of the camera and the robot that includes the camera.

In some implementations, the control unit 110 determines if the two or more images captured at two or more locations on a property include at least a portion of overlap. In order to match feature points to compute the scale factor 130, the control unit 110 can determine if two or more captured images include an overlapping portion, e.g., include at least one common feature. The control unit 110 can determine whether or not there is any overlap during the feature point detection of the feature point detector 120 or the processes of the depth generation engine 126. For example, the control unit 110 can process each of the detected feature points in each of the two or more captured images and ensure that at least one feature is depicted in both images. If not, the control unit 110 can save processing resources by not continuing processing. If there are overlapping features, the process can continue as described in FIG. 1.

The process 300 includes obtaining data indicating the two or more locations on the property (304). For example, the control unit 110 obtains VIO data 106 from the robot 102 at Time 1 and VIO data 114 from the robot 102 at Time 2. The robot 102 can generate the VIO data 106 and the VIO data 114 using a VIO system as discussed herein.

The process 300 includes detecting feature points at positions within the two or more images (306). For example, the feature point detector 120 can detect one or more points from the data obtained from the robot 102. The data can include image 108 and image 116. The feature point detector 120 can detect any number of features within the images obtained from one or more robots.

The process 300 includes comparing the positions of the feature points in a first image of the two or more images to positions of the feature points in a second image of the two or more images (308). For example, the depth generation engine 126 can compare feature points from the image 108 with feature points of the image 116. The comparison can be included in epipolar computation 128.

The process 300 includes comparing the two or more locations (310). For example, the control unit 110 can compare the location of the robot 102 corresponding to Time 1 with the location of the robot 102 corresponding to Time 2. The control unit 110 can determine the locations of the robot 102 at Time 1 and Time 2 using the first data 106 and the second data 114. The control unit 110 can determine a geometric distance indicating the distance in a coordinate system, such as Cartesian coordinates, polar coordinates, spherical coordinates, among others.

The process 300 includes generating depth data for the feature points using results of the comparison of the position of the feature points in the first image and the second image and the comparison of the two or more locations (312). For example, by performing epipolar computation 128, the depth of features detected in at least two images can be determined in arbitrary units. To convert the units to real world units, a scale factor, such as the scale factor 130 relating camera units to real world units, can be generated based on a change of location from capturing the at least two images (e.g., image 108 and image 116) and applied to arbitrary depths of features to determine real world depths. The real world depths can be included in the key frame 136 and stored in the mapping data 134 to be used for later pose estimation or localization.

The order of steps in the process 300 described above is illustrative only, and can be performed in different orders. For example, the process 300 can include operation 304 before operation 302, can include operation 304 and 310 after operation 310.

In some implementations, the process 300 can include additional steps, fewer steps, or some of the steps can be divided into multiple steps. For example, the process 300 can include operations 306 through 312 without operations 302 and 304.

Figure 4:
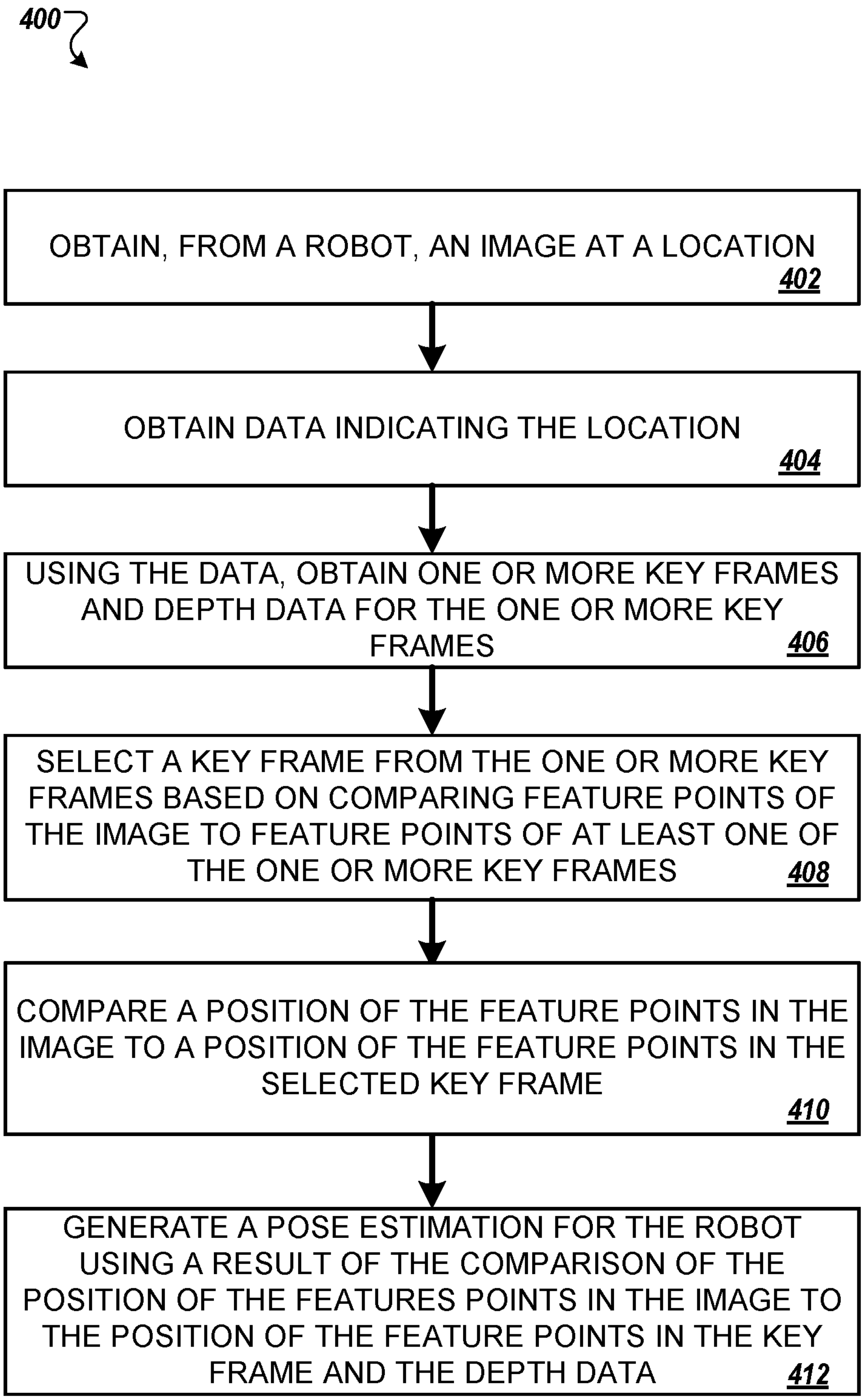
FIG. 4 is a flow diagram illustrating an example of a process of using the depth data to estimate a pose of a robot.

FIG. 4 is a flow diagram illustrating an example of a process 400 of using the depth data to estimate a pose of a robot. The process 400 can be performed by a computer, such as the control unit 110. In some implementations, based on a camera pose difference and a known relation between a camera and a robot, a control unit, such as the control unit 110 determines a robot pose difference The process 400 includes obtaining, from a robot, an image at a location (402). For example, as shown in FIG. 2, the control unit 110 can obtain image 208 from the robot 202 captured by the camera 204.

The process 400 includes obtaining data indicating the location (404). For example, the control unit 110 can obtain location data in the data 206. The location data can include VIO data where location is determined based on a VIO system of the robot 202.

The process 400 includes using the data, obtaining one or more key frames and depth data for the one or more key frames (406). For example, the key frame selector 220 obtains one or more key frames 214 from a key frame database, e.g., mapping data 134.

The process 400 includes selecting a key frame from the one or more key frames based on comparing feature points of the image to feature points of at least one of the one or more key frames (408). For example, the key frame selector 220 can select one or more key frames from one or more obtained key frames. The key frame selector 220 can select one or more key frames using detected feature points. The key frame selector 220 can determine one or more feature points in the obtained image 208 and, based on comparing the features of the image 208 to feature points of the obtained key frames, select one or more key frames for pose estimation. In general, key frames with more feature points in common with the image 208 can be selected over key frames with less features points in common.

The process 400 includes comparing a position of the feature points in the image to a position of the feature points in the selected key frame (410). For example, the pose estimation engine 226 performs epipolar computation 128 to determine a relation between features points of the image 208 and features points of the selected one or more key frames. The pose estimation engine 226 can additionally determine scale factor 230 based on stored location data corresponding to where a camera was when the camera obtained the image corresponding to the selected one or more key frames and location data obtained from the robot 202, e.g., data 206. Based on geometry, movement of a field of view in space necessarily results in translation of representations of objects. For lateral movement, objects further away move less and objects closer move more. This general process can be used to determine distances to specific points, e.g., detected features points, based on a known change of position. Similarly, the pose estimation engine 226 can determine changes of position, e.g., scale factor 230, using known distances to objects, e.g., depth data 216.

The process 400 includes generating a pose estimation for the robot using results of the comparison of the position of the features points in the image to the position of the feature points in the key frame and the depth data (412). For example, by using the depth data 216 from the key frame 136, the pose estimation engine 226 can generate the scale factor 230 to generate real world distances for the detected features points in the image 208. The control unit 110 can determine a difference between an expected pose or position of the robot 202 and an actual pose or position of the robot 202 using the real world distances. Using the difference, the control unit 110 can generate the pose correction 232 to correct a pose or position of the robot 202. The pose correction 232 can adjust a pose or position of the robot 202 to match an expected pose or position or a pose or position that complies with a flight plan or user specified parameters of normal flight or flight for a particular mission or robot, in cases where the robot is a flying robot, e.g., drone.

In some implementations, the process 400 includes providing a pose correction to the robot. For example, as shown in FIG. 2, the control unit 110 can provide the pose correction 232 to the robot 202.

The order of steps in the process 400 described above is illustrative only, and can be performed in different orders. For example, the process 400 can include operation 406 before operation 402, operation 404 before operation 402, or a combination of both.

In some implementations, the process 400 can include additional steps, fewer steps, or some of the steps can be divided into multiple steps. For example, the process 400 can include selecting a key frame using location data instead of or in addition to selecting a key frame using a comparison of feature points from the image and at least one of the one or more key frames. In some examples, the process 400 might include determining a pose adjustment using the pose estimation, e.g., and an expected pose of the robot. The process 400 can include sending instructions to the robot to cause the robot to update a pose of the pose robot. This can use the pose estimation, and optionally the expected pose of the robot.

Figure 5:
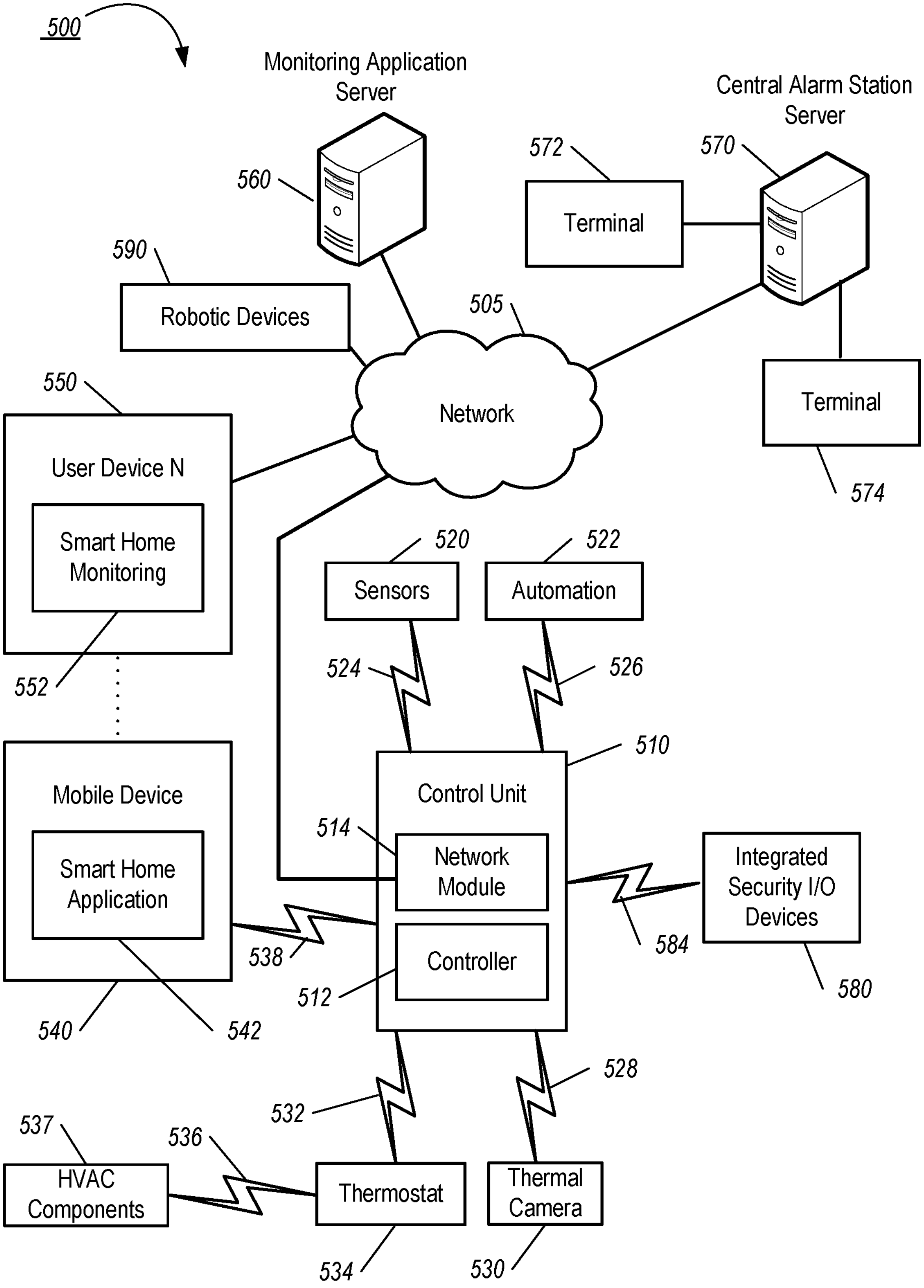
FIG. 5 is a diagram illustrating an example of a property monitoring system.

FIG. 5 is a diagram illustrating an example of a property monitoring system 500. In some cases, the property monitoring system 500 may include components of the system 100 of FIG. 1. For example, the robot 102 may be one of the robotic devices 590.

The network 505 is configured to enable exchange of electronic communications between devices connected to the network 505. For example, the network 505 may be configured to enable exchange of electronic communications between the control unit 510, the one or more user devices 540 and 550, the monitoring server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. The network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The control unit 510 includes a controller 512 and a network module 514. The controller 512 is configured to control a control unit monitoring system (e.g., a control unit system) that includes the control unit 510. In some examples, the controller 512 may include a processor or other control circuitry configured to execute instructions of a program that controls operation of a control unit system. In these examples, the controller 512 may be configured to receive input from sensors, flow meters, or other devices included in the control unit system and control operations of devices included in the household (e.g., speakers, lights, doors, etc.). For example, the controller 512 may be configured to control operation of the network module 514 included in the control unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the control unit 510 to communicate over a local area network and/or the Internet. The network module 514 also may be a voice band modem configured to enable the alarm panel to communicate over the telephone lines of Plain Old Telephone Systems (POTS).

The control unit system that includes the control unit 510 includes one or more sensors 520. For example, the monitoring system may include multiple sensors 520. The sensors 520 may include a lock sensor, a contact sensor, a motion sensor, or any other type of sensor included in a control unit system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the home. The health monitoring sensor can collect various health data, including pulse, heart rate, respiration rate, sugar or glucose level, bodily temperature, or motion data.

The sensors 520 can also include a radio-frequency identification (RFID) sensor that identifies a particular article that includes a pre-assigned RFID tag.

The system 500 also includes one or more thermal cameras 530 that communicate with the control unit 510. The thermal camera 530 may be an IR camera or other type of thermal sensing device configured to capture thermal images of a scene. For instance, the thermal camera 530 may be configured to capture thermal images of an area within a building or home monitored by the control unit 510. The thermal camera 530 may be configured to capture single, static thermal images of the area and also video thermal images of the area in which multiple thermal images of the area are captured at a relatively high frequency (e.g., thirty images per second). The thermal camera 530 may be controlled based on commands received from the control unit 510. In some implementations, the thermal camera 530 can be an IR camera that captures thermal images by sensing radiated power in one or more IR spectral bands, including NIR, SWIR, MWIR, and/or LWIR spectral bands.

The thermal camera 530 may be triggered by several different types of techniques. For instance, a Passive Infra-Red (PIR) motion sensor may be built into the thermal camera 530 and used to trigger the thermal camera 530 to capture one or more thermal images when motion is detected. The thermal camera 530 also may include a microwave motion sensor built into the camera and used to trigger the thermal camera 530 to capture one or more thermal images when motion is detected. The thermal camera 530 may have a "normally open" or "normally closed" digital input that can trigger capture of one or more thermal images when external sensors (e.g., the sensors 520, PIR, door/window, etc.) detect motion or other events. In some implementations, the thermal camera 530 receives a command to capture an image when external devices detect motion or another potential alarm event. The thermal camera 530 may receive the command from the controller 512 or directly from one of the sensors 520.

In some examples, the thermal camera 530 triggers integrated or external illuminators (e.g., Infra-Red or other lights controlled by the property automation controls 522, etc.) to improve image quality. An integrated or separate light sensor may be used to determine if illumination is desired and may result in increased image quality.

The thermal camera 530 may be programmed with any combination of time/day schedules, monitoring system status (e.g., "armed stay," "armed away," "unarmed"), or other variables to determine whether images should be captured or not when triggers occur. The thermal camera 530 may enter a low-power mode when not capturing images. In this case, the thermal camera 530 may wake periodically to check for inbound messages from the controller 512. The thermal camera 530 may be powered by internal, replaceable batteries if located remotely from the control unit 510. The thermal camera 530 may employ a small solar cell to recharge the battery when light is available. Alternatively, the thermal camera 530 may be powered by the controller's 512 power supply if the thermal camera 530 is co-located with the controller 512.

In some implementations, the thermal camera 530 communicates directly with the monitoring server 560 over the Internet. In these implementations, thermal image data captured by the thermal camera 530 does not pass through the control unit 510 and the thermal camera 530 receives commands related to operation from the monitoring server 560.

In some implementations, the system 500 includes one or more visible light cameras, which can operate similarly to the thermal camera 530, but detect light energy in the visible wavelength spectral bands. The one or more visible light cameras can perform various operations and functions within the property monitoring system 500. For example, the visible light cameras can capture images of one or more areas of the property, which the cameras, the control unit, and/or another computer system of the monitoring system 500 can process and analyze.

The system 500 also includes one or more property automation controls 522 that communicate with the control unit to perform monitoring. The property automation controls 522 are connected to one or more devices connected to the system 500 and enable automation of actions at the property. For instance, the property automation controls 522 may be connected to one or more lighting systems and may be configured to control operation of the one or more lighting systems. Also, the property automation controls 522 may be connected to one or more electronic locks at the property and may be configured to control operation of the one or more electronic locks (e.g., control Z-Wave locks using wireless communications in the Z-Wave protocol). Further, the property automation controls 522 may be connected to one or more appliances at the property and may be configured to control operation of the one or more appliances. The property automation controls 522 may include multiple modules that are each specific to the type of device being controlled in an automated manner. The property automation controls 522 may control the one or more devices based on commands received from the control unit 510. For instance, the property automation controls 522 may interrupt power delivery to a particular outlet of the property or induce movement of a smart window shade of the property.

The system 500 also includes thermostat 534 to perform dynamic environmental control at the property. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at the property and/or environmental data at the home, e.g., at various locations indoors and outdoors at the property. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the control unit 510 and can control the environmental (e.g., temperature) settings based on commands received from the control unit 510.

In some implementations, the thermostat 534 is a dynamically programmable thermostat and can be integrated with the control unit 510. For example, the dynamically programmable thermostat 534 can include the control unit 510, e.g., as an internal component to the dynamically programmable thermostat 534. In addition, the control unit 510 can be a gateway device that communicates with the dynamically programmable thermostat 534. In some implementations, the thermostat 534 is controlled via one or more property automation controls 522.

In some implementations, a module 537 is connected to one or more components of an HVAC system associated with the property, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534.

In some examples, the system 500 further includes one or more robotic devices 590. The robotic devices 590 may be any type of robot that are capable of moving and taking actions that assist in home monitoring. For example, the robotic devices 590 may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and/or roll along the ground, walls, or ceiling) and land vehicle type devices (e.g., automated cars that drive around a property). In some cases, the robotic devices 590 may be robotic devices 590 that are intended for other purposes and merely associated with the system 500 for use in appropriate circumstances. For instance, a robotic vacuum cleaner device may be associated with the monitoring system 500 as one of the robotic devices 590 and may be controlled to take action responsive to monitoring system events.

In some examples, the robotic devices 590 automatically navigate within a property. In these examples, the robotic devices 590 include sensors and control processors that guide movement of the robotic devices 590 within the property. For instance, the robotic devices 590 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 590 may include control processors that process output from the various sensors and control the robotic devices 590 to move along a path that reaches the desired destination and avoids obstacles. In this regard, the control processors detect walls or other obstacles in the property and guide movement of the robotic devices 590 in a manner that avoids the walls and other obstacles.

In addition, the robotic devices 590 may store data that describes attributes of the property. For instance, the robotic devices 590 may store a floorplan of a building on the property and/or a three-dimensional model of the property that enables the robotic devices 590 to navigate the property. During initial configuration, the robotic devices 590 may receive the data describing attributes of the property, determine a frame of reference to the data (e.g., a property or reference location in the property), and navigate the property based on the frame of reference and the data describing attributes of the property. Further, initial configuration of the robotic devices 590 also may include learning of one or more navigation patterns in which a user provides input to control the robotic devices 590 to perform a specific navigation action (e.g., fly to an upstairs bedroom and spin around while capturing video and then return to a home charging base). In this regard, the robotic devices 590 may learn and store the navigation patterns such that the robotic devices 590 may automatically repeat the specific navigation actions upon a later request.

In some examples, the robotic devices 590 may include data capture and recording devices. In these examples, the robotic devices 590 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users at the property. The one or more biometric data collection tools may be configured to collect biometric samples of a person in the property with or without contact of the person. For instance, the biometric data collection tools may include a fingerprint scanner, a hair sample collection tool, a skin cell collection tool, and/or any other tool that allows the robotic devices 590 to take and store a biometric sample that can be used to identify the person (e.g., a biometric sample with DNA that can be used for DNA testing).

In some implementations, one or more of the thermal cameras 530 may be mounted on one or more of the robotic devices 590.

In some implementations, the robotic devices 590 may include output devices. In these implementations, the robotic devices 590 may include one or more displays, one or more speakers, and/or any type of output devices that allow the robotic devices 590 to communicate information to a nearby user.

The robotic devices 590 also may include a communication module that enables the robotic devices 590 to communicate with the control unit 510, each other, and/or other devices. The communication module may be a wireless communication module that allows the robotic devices 590 to communicate wirelessly. For instance, the communication module may be a Wi-Fi module that enables the robotic devices 590 to communicate over a local wireless network at the property. The communication module further may be a 900 MHz wireless communication module that enables the robotic devices 590 to communicate directly with the control unit 510. Other types of short-range wireless communication protocols, such as Bluetooth, Bluetooth LE, Z-wave, Zigbee, etc., may be used to allow the robotic devices 590 to communicate with other devices in the property. In some implementations, the robotic devices 590 may communicate with each other or with other devices of the system 500 through the network 505.

The robotic devices 590 further may include processor and storage capabilities. The robotic devices 590 may include any suitable processing devices that enable the robotic devices 590 to operate applications and perform the actions described throughout this disclosure. In addition, the robotic devices 590 may include solid state electronic storage that enables the robotic devices 590 to store applications, configuration data, collected sensor data, and/or any other type of information available to the robotic devices 590.

The robotic devices 590 can be associated with one or more charging stations. The charging stations may be located at predefined home base or reference locations at the property. The robotic devices 590 may be configured to navigate to the charging stations after completion of tasks needed to be performed for the monitoring system 500. For instance, after completion of a monitoring operation or upon instruction by the control unit 510, the robotic devices 590 may be configured to automatically fly to and land on one of the charging stations. In this regard, the robotic devices 590 may automatically maintain a fully charged battery in a state in which the robotic devices 590 are ready for use by the monitoring system 500.

The charging stations may be contact-based charging stations and/or wireless charging stations. For contact-based charging stations, the robotic devices 590 may have readily accessible points of contact that the robotic devices 590 are capable of positioning and mating with a corresponding contact on the charging station. For instance, a helicopter type robotic device 590 may have an electronic contact on a portion of its landing gear that rests on and mates with an electronic pad of a charging station when the helicopter type robotic device 590 lands on the charging station. The electronic contact on the robotic device 590 may include a cover that opens to expose the electronic contact when the robotic device 590 is charging and closes to cover and insulate the electronic contact when the robotic device is in operation.

For wireless charging stations, the robotic devices 590 may charge through a wireless exchange of power. In these cases, the robotic devices 590 need only locate themselves closely enough to the wireless charging stations for the wireless exchange of power to occur. In this regard, the positioning needed to land at a predefined home base or reference location in the property may be less precise than with a contact based charging station. Based on the robotic devices 590 landing at a wireless charging station, the wireless charging station outputs a wireless signal that the robotic devices 590 receive and convert to a power signal that charges a battery maintained on the robotic devices 590.

In some implementations, each of the robotic devices 590 has a corresponding and assigned charging station such that the number of robotic devices 590 equals the number of charging stations. In these implementations, the robotic devices 590 always navigate to the specific charging station assigned to that robotic device. For instance, a first robotic device 590 may always use a first charging station and a second robotic device 590 may always use a second charging station.

In some examples, the robotic devices 590 may share charging stations. For instance, the robotic devices 590 may use one or more community charging stations that are capable of charging multiple robotic devices 590. The community charging station may be configured to charge multiple robotic devices 590 in parallel. The community charging station may be configured to charge multiple robotic devices 590 in serial such that the multiple robotic devices 590 take turns charging and, when fully charged, return to a predefined home base or reference location in the property that is not associated with a charger. The number of community charging stations may be less than the number of robotic devices 590.

Also, the charging stations may not be assigned to specific robotic devices 590 and may be capable of charging any of the robotic devices 590. In this regard, the robotic devices 590 may use any suitable, unoccupied charging station when not in use. For instance, when one of the robotic devices 590 has completed an operation or is in need of battery charge, the control unit 510 references a stored table of the occupancy status of each charging station and instructs the robotic device 590 to navigate to the nearest charging station that is unoccupied.

The system 500 further includes one or more integrated security devices 580. The one or more integrated security devices may include any type of device used to provide alerts based on received sensor data. For instance, the one or more control units 510 may provide one or more alerts to the one or more integrated security input/output devices 580. Additionally, the one or more control units 510 may receive one or more sensor data from the sensors 520 and determine whether to provide an alert to the one or more integrated security input/output devices 580.

The sensors 520, the property automation controls 522, the thermal camera 530, the thermostat 534, and the integrated security devices 580 may communicate with the controller 512 over communication links 524, 526, 528, 532, and 584. The communication links 524, 526, 528, 532, and 584 may be a wired or wireless data pathway configured to transmit signals from the sensors 520, the property automation controls 522, the thermal camera 530, the thermostat 534, and the integrated security devices 580 to the controller 512. The sensors 520, the property automation controls 522, the thermal camera 530, the thermostat 534, and the integrated security devices 580 may continuously transmit sensed values to the controller 512, periodically transmit sensed values to the controller 512, or transmit sensed values to the controller 512 in response to a change in a sensed value.

The communication links 524, 526, 528, 532, and 584 may include a local network. The sensors 520, the property automation controls 522, the thermal camera 530, the thermostat 534, and the integrated security devices 580, and the controller 512 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 560 is one or more electronic devices configured to provide monitoring services by exchanging electronic communications with the control unit 510, the one or more user devices 540 and 550, and the central alarm station server 570 over the network 505. For example, the monitoring server 560 may be configured to monitor events (e.g., alarm events) generated by the control unit 510. In this example, the monitoring server 560 may exchange electronic communications with the network module 514 included in the control unit 510 to receive information regarding events (e.g., alerts) detected by the control unit 510. The monitoring server 560 also may receive information regarding events (e.g., alerts) from the one or more user devices 540 and 550.

In some examples, the monitoring server 560 may route alert data received from the network module 514 or the one or more user devices 540 and 550 to the central alarm station server 570. For example, the monitoring server 560 may transmit the alert data to the central alarm station server 570 over the network 505.

The monitoring server 560 may store sensor data, thermal image data, and other monitoring system data received from the monitoring system and perform analysis of the sensor data, thermal image data, and other monitoring system data received from the monitoring system. Based on the analysis, the monitoring server 560 may communicate with and control aspects of the control unit 510 or the one or more user devices 540 and 550.

The monitoring server 560 may provide various monitoring services to the system 500. For example, the monitoring server 560 may analyze the sensor, thermal image, and other data to determine an activity pattern of a resident of the property monitored by the system 500. In some implementations, the monitoring server 560 may analyze the data for alarm conditions or may determine and perform actions at the property by issuing commands to one or more of the automation controls 522, possibly through the control unit 510.

The central alarm station server 570 is an electronic device configured to provide alarm monitoring service by exchanging communications with the control unit 510, the one or more mobile devices 540 and 550, and the monitoring server 560 over the network 505. For example, the central alarm station server 570 may be configured to monitor alerting events generated by the control unit 510. In this example, the central alarm station server 570 may exchange communications with the network module 514 included in the control unit 510 to receive information regarding alerting events detected by the control unit 510. The central alarm station server 570 also may receive information regarding alerting events from the one or more mobile devices 540 and 550 and/or the monitoring server 560.

The central alarm station server 570 is connected to multiple terminals 572 and 574. The terminals 572 and 574 may be used by operators to process alerting events. For example, the central alarm station server 570 may route alerting data to the terminals 572 and 574 to enable an operator to process the alerting data. The terminals 572 and 574 may include general-purpose computers (e.g., desktop personal computers, workstations, or laptop computers) that are configured to receive alerting data from a server in the central alarm station server 570 and render a display of information based on the alerting data. For instance, the controller 512 may control the network module 514 to transmit, to the central alarm station server 570, alerting data indicating that a sensor 520 detected motion from a motion sensor via the sensors 520. The central alarm station server 570 may receive the alerting data and route the alerting data to the terminal 572 for processing by an operator associated with the terminal 572. The terminal 572 may render a display to the operator that includes information associated with the alerting event (e.g., the lock sensor data, the motion sensor data, the contact sensor data, etc.) and the operator may handle the alerting event based on the displayed information.

In some implementations, the terminals 572 and 574 may be mobile devices or devices designed for a specific function. Although FIG. 5 illustrates two terminals for brevity, actual implementations may include more (and, perhaps, many more) terminals.

The one or more authorized user devices 540 and 550 are devices that host and display user interfaces. For instance, the user device 540 is a mobile device that hosts or runs one or more native applications (e.g., the smart home application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a smart home application 542. The smart home application 542 refers to a software/firmware program running on the corresponding mobile device that enables the user interface and features described throughout. The user device 540 may load or install the smart home application 542 based on data received over a network or data received from local media. The smart home application 542 runs on mobile devices platforms, such as iPhone, iPod touch, Blackberry, Google Android, Windows Mobile, etc. The smart home application 542 enables the user device 540 to receive and process image and sensor data from the monitoring system.

The user device 550 may be a general-purpose computer (e.g., a desktop personal computer, a workstation, or a laptop computer) that is configured to communicate with the monitoring server 560 and/or the control unit 510 over the network 505. The user device 550 may be configured to display a smart home user interface 552 that is generated by the user device 550 or generated by the monitoring server 560. For example, the user device 550 may be configured to display a user interface (e.g., a web page) provided by the monitoring server 560 that enables a user to perceive images captured by the thermal camera 530 and/or reports related to the monitoring system. Although FIG. 5 illustrates two user devices for brevity, actual implementations may include more (and, perhaps, many more) or fewer user devices.

The smart home application 542 and the smart home user interface 552 can allow a user to interface with the property monitoring system 500, for example, allowing the user to view monitoring system settings, adjust monitoring system parameters, customize monitoring system rules, and receive and view monitoring system messages.

In some implementations, the one or more user devices 540 and 550 communicate with and receive monitoring system data from the control unit 510 using the communication link 538. For instance, the one or more user devices 540 and 550 may communicate with the control unit 510 using various local wireless protocols such as Wi-Fi, Bluetooth, Z-wave, Zigbee, HomePlug (ethernet over power line), or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring server 560) may be significantly slower.

Although the one or more user devices 540 and 550 are shown as communicating with the control unit 510, the one or more user devices 540 and 550 may communicate directly with the sensors 520 and other devices controlled by the control unit 510. In some implementations, the one or more user devices 540 and 550 replace the control unit 510 and perform the functions of the control unit 510 for local monitoring and long range/offsite communication.

In other implementations, the one or more user devices 540 and 550 receive monitoring system data captured by the control unit 510 through the network 505. The one or more user devices 540, 550 may receive the data from the control unit 510 through the network 505 or the monitoring server 560 may relay data received from the control unit 510 to the one or more user devices 540 and 550 through the network 505. In this regard, the monitoring server 560 may facilitate communication between the one or more user devices 540 and 550 and the monitoring system 500.

In some implementations, the one or more user devices 540 and 550 may be configured to switch whether the one or more user devices 540 and 550 communicate with the control unit 510 directly (e.g., through link 538) or through the monitoring server 560 (e.g., through network 505) based on a location of the one or more user devices 540 and 550. For instance, when the one or more user devices 540 and 550 are located close to the control unit 510 and in range to communicate directly with the control unit 510, the one or more user devices 540 and 550 use direct communication. When the one or more user devices 540 and 550 are located far from the control unit 510 and not in range to communicate directly with the control unit 510, the one or more user devices 540 and 550 use communication through the monitoring server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the system 500 includes the one or more user devices 540 and 550, the sensors 520, the property automation controls 522, the thermal camera 530, and the robotic devices 590. The one or more user devices 540 and 550 receive data directly from the sensors 520, the property automation controls 522, the thermal camera 530, and the robotic devices 590 (i.e., the monitoring system components) and sends data directly to the monitoring system components. The one or more user devices 540, 550 provide the appropriate interfaces/processing to provide visual surveillance and reporting.

In other implementations, the system 500 further includes network 505 and the sensors 520, the property automation controls 522, the thermal camera 530, the thermostat 534, and the robotic devices 590 are configured to communicate sensor and image data to the one or more user devices 540 and 550 over network 505 (e.g., the Internet, cellular network, etc.). In yet another implementation, the sensors 520, the property automation controls 522, the thermal camera 530, the thermostat 534, and the robotic devices 590 (or a component, such as a bridge/router) are intelligent enough to change the communication pathway from a direct local pathway when the one or more user devices 540 and 550 are in close physical proximity to the sensors 520, the property automation controls 522, the thermal camera 530, the thermostat 534, and the robotic devices 590 to a pathway over network 505 when the one or more user devices 540 and 550 are farther from the sensors 520, the property automation controls 522, the thermal camera 530, the thermostat 534, and the robotic devices 590. In some examples, the system leverages GPS information from the one or more user devices 540 and 550 to determine whether the one or more user devices 540 and 550 are close enough to the monitoring system components to use the direct local pathway or whether the one or more user devices 540 and 550 are far enough from the monitoring system components that the pathway over network 505 is required. In other examples, the system leverages status communications (e.g., pinging) between the one or more user devices 540 and 550 and the sensors 520, the property automation controls 522, the thermal camera 530, the thermostat 534, and the robotic devices 590 to determine whether communication using the direct local pathway is possible. If communication using the direct local pathway is possible, the one or more user devices 540 and 550 communicate with the sensors 520, the property automation controls 522, the thermal camera 530, the thermostat 534, and the robotic devices 590 using the direct local pathway. If communication using the direct local pathway is not possible, the one or more user devices 540 and 550 communicate with the monitoring system components using the pathway over network 505.

In some implementations, the system 500 provides end users with access to thermal images captured by the thermal camera 530 to aid in decision making. The system 500 may transmit the thermal images captured by the thermal camera 530 over a wireless WAN network to the user devices 540 and 550. Because transmission over a wireless WAN network may be relatively expensive, the system 500 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the thermal camera 530 or other cameras of the system 500). In these implementations, the thermal camera 530 may be set to capture thermal images on a periodic basis when the alarm system is armed in an "armed away" state, but set not to capture images when the alarm system is armed in an "armed stay" or "unarmed" state. In addition, the thermal camera 530 may be triggered to begin capturing thermal images when the alarm system detects an event, such as an alarm event, a door-opening event for a door that leads to an area within a field of view of the thermal camera 530, or motion in the area within the field of view of the thermal camera 530. In other implementations, the thermal camera

530 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random-access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure. A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The invention claimed is:

1. One or more non-transitory computer storage media encoded with instructions that, when executed by one or more computers, cause the one or more computers to perform operations comprising:

obtaining, from a robot, an image at a location of a property;

obtaining data indicating the location;

selecting a key frame from one or more key frames for the property using the data indicating the location and the one or more key frames;

comparing, for each of at least one feature point in the key frame, a position of the respective feature point in the image to a position of the respective feature point in the key frame;

accessing depth data for the key frame;

after accessing the depth data, determining a scale factor using the depth data for the key frame;

generating a pose estimation for the robot using the scale factor and a result of the comparison, for the at least one feature point in the key frame, of the position of the respective feature point in the image to the position of the respective feature point in the key frame; and transmitting, to a component in the robot, an instruction for the robot to:

update a pose of the robot using the pose estimation; and navigate through the property using the updated pose.

2. The computer storage media of claim 1, wherein comparing, for each of the at least one feature point in the key frame, the position of the respective feature point in the image to the position of the respective feature point in the key frame uses an epipolar process.

3. The computer storage media of claim 2, wherein determining the scale factor comprises determining the scale factor using a key frame location at the property at which a camera captured the key frame and the location at the property for the image.

4. The computer storage media of claim 1, wherein transmitting the instruction for the robot to update the pose of the robot uses the pose estimation and an expected pose of the robot.

5. The computer storage media of claim 1, the operations comprising obtaining, using the data indicating the location, the one or more key frames and depth data for the one or more key frames.

6. The computer storage media of claim 1, wherein selecting the key frame from the one or more key frames for the property using the data indicating the location and the one or more key frames uses a result of a comparison of first feature points of the image to second feature points of at least one of the one or more key frames.

7. The computer storage media of claim 1, wherein selecting the key frame from the one or more key frames for the property using the data indicating the location and the one or more key frames uses the location at the property for the image and at least one location of a respective key frame from the one or more key frames.

8. A method comprising:

obtaining, from a robot, an image at a location of a property;

obtaining data indicating the location;

selecting a key frame from one or more key frames for the property using the data indicating the location and the one or more key frames;

comparing, for each of at least one feature point in the key frame, a position of the respective feature point in the image to a position of the respective feature point in the key frame;

accessing depth data for the key frame;

after accessing the depth data, determining a scale factor using the depth data for the key frame;

generating a pose estimation for the robot using the scale factor and a result of the comparison, for the at least one feature point in the key frame, of the position of the respective feature point in the image to the position of the respective feature point in the key frame; and transmitting, to a component in the robot, an instruction for the robot to:

update a pose of the robot using the pose estimation; and navigate through the property using the updated pose.

9. The method of claim 8, wherein comparing, for each of the at least one feature point in the key frame, the position of the respective feature point in the image to the position of the respective feature point in the key frame uses an epipolar process.

10. The method of claim 9, wherein determining the scale factor comprises determining the scale factor using a key frame location at the property at which a camera captured the key frame and the location at the property for the image.

11. The method of claim 8, wherein selecting the key frame from the one or more key frames for the property using the data indicating the location and the one or more key frames uses the location at the property for the image and at least one location of a respective key frame from the one or more key frames.

12. A system comprising one or more computers and one or more storage devices on which are stored instructions that are operable, when executed by the one or more computers, to cause the one or more computers to perform operations comprising:

obtaining, from a robot, an image at a location of a property;

obtaining data indicating the location;

selecting a key frame from one or more key frames for the property using the data indicating the location and the one or more key frames;

comparing, for each of at least one feature point in the key frame, a position of the respective feature point in the image to a position of the respective feature point in the key frame;

accessing depth data for the key frame;

after accessing the depth data, determining a scale factor using the depth data for the key frame;

generating a pose estimation for the robot using the scale factor and a result of the comparison, for the at least one feature point in the key frame, of the position of the respective feature point in the image to the position of the respective feature point in the key frame; and transmitting, to a component in the robot, an instruction for the robot to:

update a pose of the robot using the pose estimation; and navigate through the property using the updated pose.

13. The computer storage media of claim 1, wherein the operations comprise: obtaining a first image captured by a camera at a first location of the property and a second image captured by the camera at a second, different location of the property; detecting feature points at positions within the first image and the second image, the feature points including first feature points in the first image and second feature points in the second image; comparing the positions of the first feature points in the first image to positions of the second feature points in the second image; obtaining data indicating at least the first location and the second location at the property; comparing at least the first location and the second location; and using results of a) the comparison of the position of the feature points in the first image and the second image and b) the comparison of at least the first location and the second location, generating the depth data for the feature points for use by the robot navigating the property, wherein generating the pose estimation uses the depth data.

14. The computer storage media of claim 13, wherein generating the depth data for the feature points uses an epipolar process and the scale factor.

15. The computer storage media of claim 14, wherein the scale factor maps camera units to real world units for the property.

16. The computer storage media of claim 14, the operations comprising generating the scale factor using a change between a first location at which the first image was captured and a second location at which the second image was captured, at least the first location and the second location.

17. The computer storage media of claim 14, the operations comprising generating the scale factor using an amount of overlap between the first image and the second image.

18. The computer storage media of claim 13, the operations comprising determining whether a difference between a first location at which the first image was captured and a second location at which the second image was captured satisfies a difference threshold, wherein generating the depth data for the feature points is responsive to determining that the difference between the first location at which the first image was captured and the second location at which the second image was captured satisfies the difference threshold.

19. The computer storage media of claim 13, wherein generating the depth data for the feature points comprises generating depth data that indicates a relationship between the first feature points of the first image and the second feature points of the second image.

20. The computer storage media of claim 13, comprising providing the depth data to the robot to cause the robot to use the depth data for navigation at the property.

* * * * *